United States Patent
Yonezawa

(10) Patent No.: US 10,783,390 B2
(45) Date of Patent: Sep. 22, 2020

(54) RECORDING MEDIUM RECORDING CHARACTER AREA EXTRACTION PROGRAM, INFORMATION PROCESSING APPARATUS AND CHARACTER AREA EXTRACTION METHOD

(71) Applicant: FUJITSU LIMITED, Kawasaki-shi, Kanagawa (JP)

(72) Inventor: Kazuya Yonezawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 16/164,864

(22) Filed: Oct. 19, 2018

(65) Prior Publication Data

US 2019/0156135 A1 May 23, 2019

(30) Foreign Application Priority Data

Nov. 22, 2017 (JP) ................................. 2017-225029

(51) Int. Cl.
| | |
|---|---|
| G06K 9/20 | (2006.01) |
| G06K 9/34 | (2006.01) |
| G06T 3/40 | (2006.01) |
| G06K 9/46 | (2006.01) |
| G06K 9/32 | (2006.01) |

(52) U.S. Cl.
CPC .......... *G06K 9/2054* (2013.01); *G06K 9/3283* (2013.01); *G06K 9/344* (2013.01); *G06K 9/4604* (2013.01); *G06T 3/40* (2013.01); *G06K 2209/01* (2013.01)

(58) Field of Classification Search
CPC .... G06K 9/3283; G06K 9/2054; G06K 9/344; G06K 9/4604; G06K 2209/01; H04N 1/00331; H04N 1/40068; H04N 2201/0084; G06T 3/40

See application file for complete search history.

(56) References Cited

U.S. PATENT DOCUMENTS

| | | | |
|---|---|---|---|
| 2013/0343652 A1* | 12/2013 | Goto | G06K 9/342 382/182 |
| 2015/0371399 A1* | 12/2015 | Tonouchi | G06T 7/11 382/176 |

FOREIGN PATENT DOCUMENTS

JP 2012-108689 6/2012

\* cited by examiner

*Primary Examiner* — Brenda C Bernardi
(74) *Attorney, Agent, or Firm* — Fujitsu Patent Center

(57) ABSTRACT

A non-transitory computer-readable recording medium recording a character area extraction program for causing a computer to execute a process includes changing a relationship in relative sizes between an image and a scanning window that scans the image; scanning the scanning window based on a changed relationship, specifying a scanning position at which an edge density of an image area included in the scanning window is equal to or larger than a threshold value, extracting one or more areas indicated by the scanning window at the specified scanning position as one or more character area candidates, determining, when overlapped character area candidates included in the one or more character area candidates overlap with each other, a maximum character area candidate having a maximum edge density among the overlapped character area candidates, and extracting the image area included in the maximum character area candidate as a character area.

12 Claims, 9 Drawing Sheets

RECORDING MEDIUM RECORDING CHARACTER AREA EXTRACTION PROGRAM, INFORMATION PROCESSING APPARATUS AND CHARACTER AREA EXTRACTION METHOD

CROSS-REFERENCE TO RELATED APPLICATION

This application is based upon and claims the benefit of priority of the prior Japanese Patent Application No. 2017-225029, filed on Nov. 22, 2017, the entire contents of which are incorporated herein by reference.

FIELD

The embodiments discussed herein are related to a recording medium for recording a character area extraction program, an information processing apparatus, and a character area extraction method.

BACKGROUND

In a character recognition processing, an area (character area) including characters (e.g., characters written on a signboard or sign) is extracted from, for example, a photographed image captured by an image capturing device. Character recognition is performed with respect to the extracted character area.

Related technologies are disclosed in, for example, Japanese Laid-open Patent Publication No. 2012-108689.

SUMMARY

According to one aspect of the embodiments, a non-transitory computer-readable recording medium recording a character area extraction program for causing a computer to execute a process includes: changing a relationship in relative sizes between an image and a scanning window that scans the image; scanning the scanning window based on a changed relationship; specifying a scanning position at which an edge density of an image area included in the scanning window is equal to or larger than a threshold value; extracting one or more areas indicated by the scanning window at the specified scanning position as one or more character area candidates; determining, when overlapped character area candidates included in the one or more character area candidates overlap with each other, a maximum character area candidate having a maximum edge density among the overlapped character area candidates; and extracting the image area included in the maximum character area candidate as a character area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
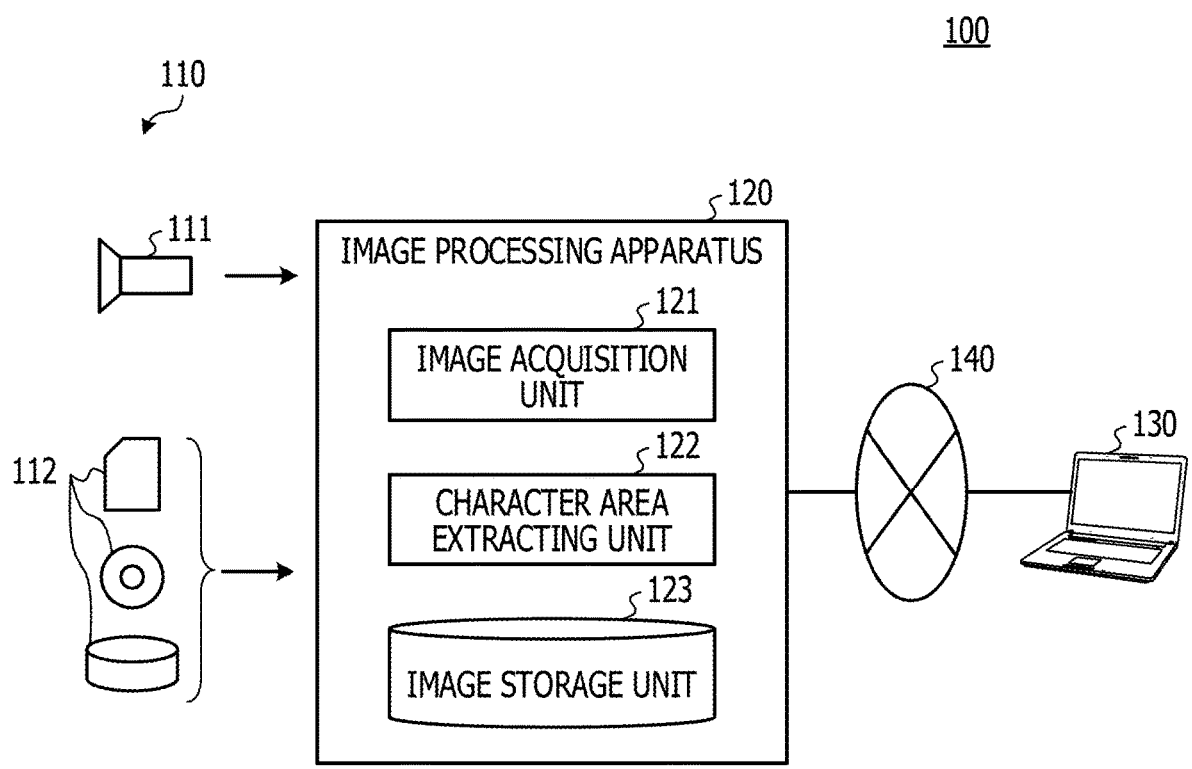
FIG. 1 illustrates an example of an image processing system.

In a character recognition processing, it is required that character areas are extracted from, for example, captured images without excess or deficiency. However, in the case of characters included in, for example, the captured images, the sizes of characters are not standardized. For this reason, a plurality of characters having different sizes is included. Therefore, an unextracted character area may occur.

For example, a plurality of images with different resolutions is generated. Candidates of the character areas are detected from images of the plurality of respective resolutions. An area in which the detected character area candidates overlap for more than a predetermined number is extracted as the character area.

According to the extraction method, even in a case where a plurality of characters having different sizes is included, respective character areas may be extracted.

For example, in the extraction method, the extracted character area includes many background images other than characters. For example, an area wider than an area where characters actually exist is extracted as the character area. Therefore, an extraction accuracy (a ratio of the area in which the characters are actually present, which is occupied in the extracted character area) is low. Therefore, when the character recognition is performed using the extracted character area, the character recognition accuracy may decrease.

For example, a technique may be provided, which enhances the extraction accuracy when extracting the character area from an image.

In the present specification and the drawings, components having a substantially similar functional configuration will be denoted with the same reference numeral, and overlapping descriptions thereof will be omitted.

First Embodiment

<System Configuration of Image Processing System>

FIG. 1 illustrates an example of an image processing system.

As illustrated in FIG. 1, the image processing system 100 includes an image providing apparatus 110, an image processing apparatus 120, and a terminal 130. The image providing apparatus 110 is connected to the image processing apparatus 120 via a wired or wireless network (or the image providing apparatus 110 is directly set in a drive device of the image processing apparatus 120). The image processing apparatus 120 and the terminal 130 are connected to each other via a network 140.

The image providing apparatus 110 is an apparatus or a medium that provides image data such as captured images to the image processing apparatus 120, and in the first embodiment, the image providing apparatus 110 includes an imaging apparatus 111 and various recording media 112. The recording medium 112 is a medium capable of storing the image data, and the recording medium 112 includes a predetermined medium.

The image processing apparatus 120 is an example of a character area extraction apparatus. An image acquisition program and a character area extraction program are installed in the image processing apparatus 120, and when the program is executed, the image processing apparatus 120 serves as an image acquisition unit 121 and a character area extracting unit 122.

The image acquisition unit 121 acquires the image data from the image providing apparatus 110 and stores the acquired image data in an image storage unit 123. The character area extracting unit 122 reads out the image data stored in the image storage unit 123 and extracts the character area in each frame included in the image data. The character area extracting unit 122 transmits the extracted character area together with the image data to the terminal 130 via the network 140.

The terminal 130 receives the image data transmitted from the character area extracting unit 122 via the network 140 and performs a character recognition processing with respect to the character area in each frame included in the image data. The terminal 130 outputs a result of the character recognition processing.

<Hardware Configuration of Image Processing Apparatus>

Figure 2:
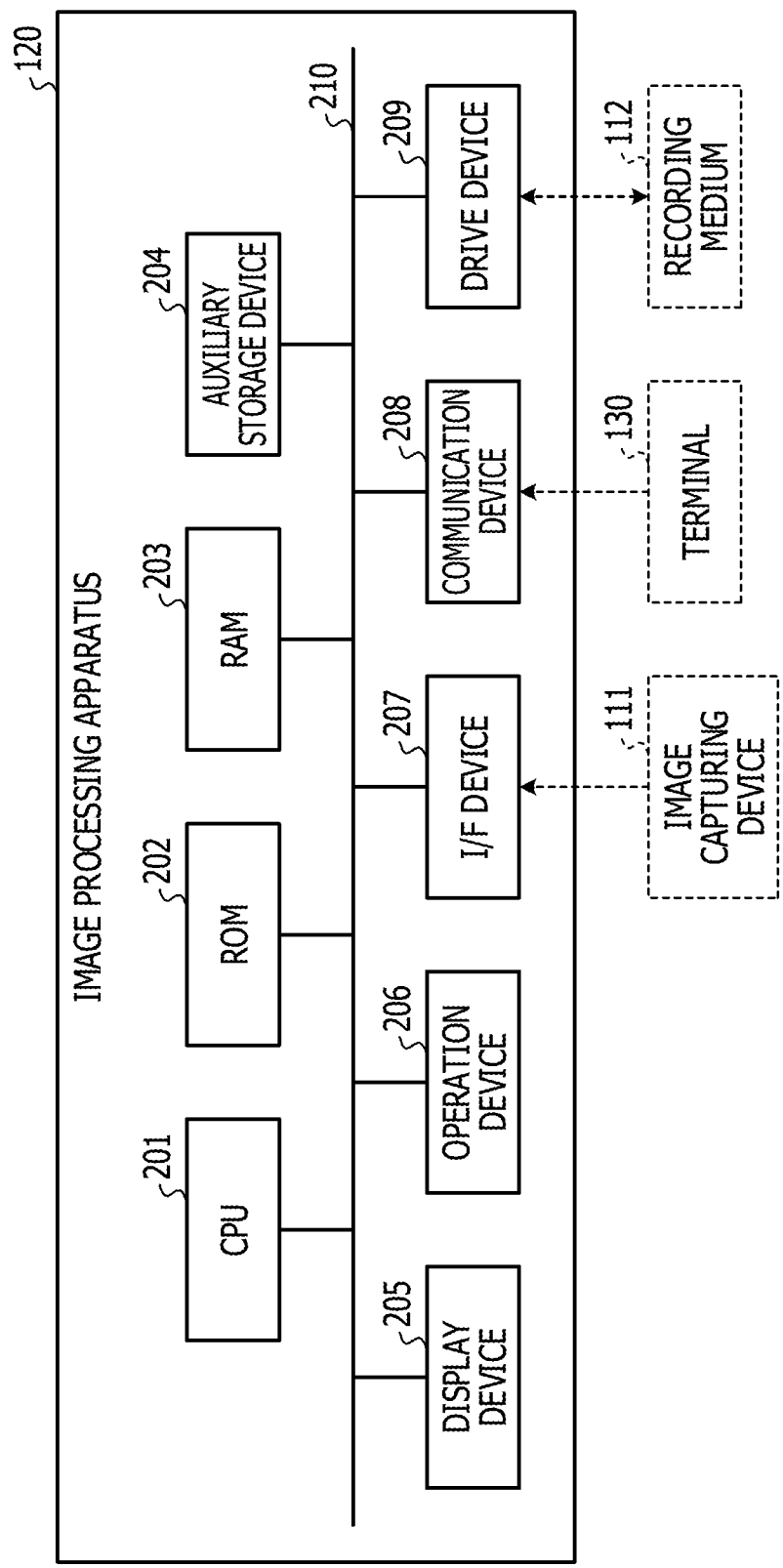
FIG. 2 illustrates an example of a hardware configuration of an image processing apparatus.

FIG. 2 illustrates an example of a hardware configuration of an image processing apparatus. As illustrated in FIG. 2, the image processing apparatus 120 includes a CPU (central processing unit) 201, a read only memory (ROM) 202, and a random access memory (RAM) 203. The CPU 201, the ROM 202, and the RAM 203 form a so-called computer.

The image processing apparatus 120 includes an auxiliary storage device 204, a display device 205, an operation device 206, an interface (I/F) device 207, a communication device 208, and a drive device 209. Further, the respective hardware components of the image processing apparatus 120 are connected to each other via a bus 210.

The CPU 201 is an arithmetic device that executes various programs (e.g., image acquisition program and character area extraction program) installed in the auxiliary storage device 204.

The ROM 202 is a nonvolatile memory. The ROM 202 serves as a main storage device for storing, for example, various programs and data which the CPU 201 requires to execute the various programs installed in the auxiliary storage device 204. For example, the ROM 202 functions as a main storage device for storing, for example, a boot program, such as a basic input/output system (BIOS) or an extensible firmware interface (EFI).

The RAM 203 is a volatile memory such as a dynamic random access memory (DRAM) or a static random access memory (SRAM). The RAM 203 serves as a main storage device for providing a working area developed when various programs installed in the auxiliary storage device 204 are executed by the CPU 201.

The auxiliary storage device 204 is an auxiliary storage device that stores, for example, various programs and image data processed by execution of various programs. For example, the image storage unit 123 is implemented by the auxiliary storage device 204.

The display device 205 is a display device for displaying, for example, an internal state of the image processing apparatus 120. The operation device 206 is an input device for an administrator of the image processing apparatus 120 to input various instructions to the image processing apparatus 120.

The I/F device 207 is a connection device for connecting with, for example, the imaging apparatus 111 in the image providing apparatus 110. The communication device 208 is a communication device for communicating with the terminal 130 via the network 140.

The drive device 209 is a device for setting, for example, the recording medium 112 in the image providing apparatus 110. The recording medium 112 referred to here includes, for example, a medium that optically, electrically, or magnetically records information, such as a CD-ROM, a flexible disk or a magneto-optical disk. The recording medium 112 may include, for example, a semiconductor memory for electrically recording information, such as, for example, a ROM, or a flash memory.

The drive device 209 may be used when installing various programs in the auxiliary storage device 204. For example, an administrator of the image processing apparatus 120 sets the distributed recording medium 112 in the drive device 209 to allow the driver device 209 to read out various programs recorded in the recording medium 112, so that various kinds of programs may be installed in the auxiliary storage device 204.

Alternatively, installation of various programs in the auxiliary storage device 204 may be performed via the communication device 208. For example, the administrator of the image processing apparatus 120 may download various programs from the network 140 via the communication device 208, so that various programs may be installed in the auxiliary storage device 204.

<Functional Configuration of Character Area Extracting Unit>

Figure 3:
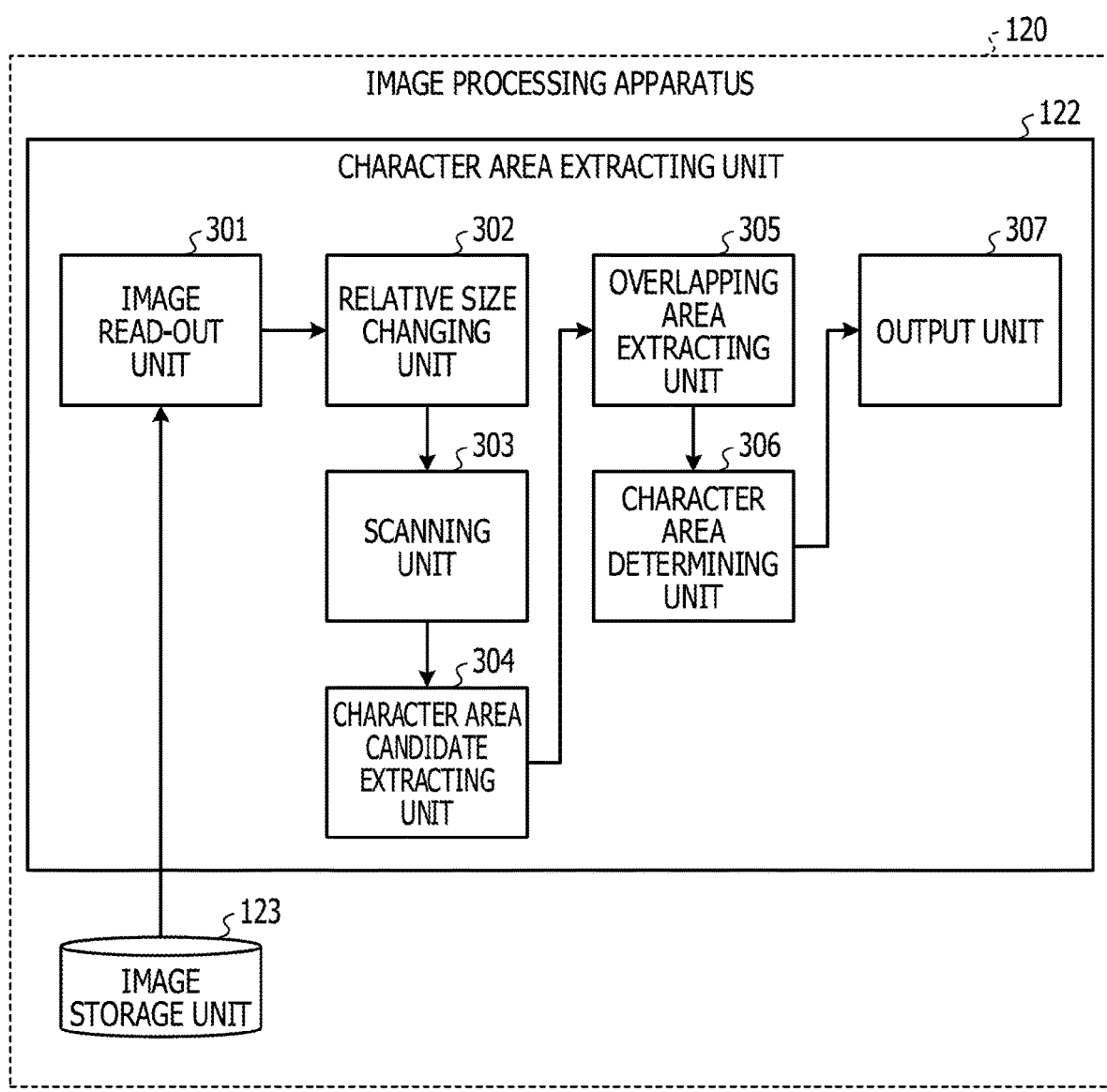
FIG. 3 illustrates an example of a functional configuration of a character area extracting unit.

FIG. 3 illustrates an example of a functional configuration of a character area extracting unit.

As illustrated in FIG. 3, the character area extracting unit 122 includes an image read-out unit 301, a relative size changing unit 302, a scanning unit 303, a character area candidate extracting unit 304, an overlapping area extracting unit 305, a character area determining unit 306, and an output unit 307.

The image read-out unit 301 reads out the image data stored in the image storage unit 123 for each frame and notifies the read-out image data to the relative size changing unit 302.

The relative size changing unit 302 is an example of a changing means and changes the resolution with respect to the notified image data having a unit of frame. The relative size changing unit 302 sequentially changes the resolution on the basis of a predetermined change pattern to sequentially change the relationship of a relative size between the image data and a scanning window having a fixed size.

For example, the relative size changing unit 302 sequentially changes the vertical resolution in a state where the horizontal resolution of the image data is fixed to a predetermined resolution. When the change of the vertical resolution is completed for a predetermined change range, the relative size changing unit 302 continuously fixes the horizontal resolution of the image data to another resolution and similarly changes the vertical resolution in sequence. The relative size changing unit 302 repeats the processing and achieves a combination of all of the vertical and horizontal resolutions by completing a change of a predetermined change range with respect to the horizontal resolution.

Every time the resolution of the image data is changed based on the predetermined change pattern, the scanning unit 303 scans the image data of the resolution after the change by using the fixed size scanning window. The scanning unit 303 extracts an image area included in the scanning window at each scanning position and notifies the extracted image area to the character area candidate extracting unit 304.

The character area candidate extracting unit 304 is an example of an extraction means and extracts edge pixels from the image area included in the scanning window and calculates the edge density of the image area. The edge density refers to a ratio of the number of pixels of the edge pixel to the total number of pixels of the image area included in the scanning window.

The character area candidate extracting unit 304 specifies a scanning position at which the calculated edge density is equal to or larger than a predetermined threshold value and extracts an area indicated by the scanning window at a specified scanning position as a character area candidate. Furthermore, the character area candidate extracting unit 304 notifies the extracted character area candidate to the overlapping area extracting unit 305 together with the (vertical and horizontal) resolution at that time.

The overlapping area extracting unit 305 enlarges or reduces the character area candidate notified from the character area candidate extracting unit 304. For example, the overlapping area extracting unit 305 calculates an enlargement ratio or a reduction ratio when enlarging or reducing the image data from which each character area candidate is extracted to image data of unified resolution, and enlarges or reduces the character area candidate.

The overlapping area extracting unit 305 arranges the enlarged or reduced character area candidates in the image data of unified resolution. Further, the overlapping area extracting unit 305 determines whether the character area candidates overlap with each other in a predetermined threshold area or more with respect to the image data in which the enlarged or reduced character area candidate is arranged. When it is determined that the character area candidates overlap with each other in the predetermined threshold area or more, the overlapping area extracting unit 305 extracts overlapping character area candidates and associates the extracted character area candidates with each other.

The character area determining unit 306 is an example of a determination unit, and determines a character area candidate having maximum edge density from the character area candidates associated by the overlapping area extracting unit 305. The character area determining unit 306 extracts the image area included in the determined character area candidate as the character area.

The output unit 307 outputs the character area extracted by the character area determining unit 306 in association with the image data of a processing target frame.

<Relationship of Resolution and Edge Density>

Figure 4A:
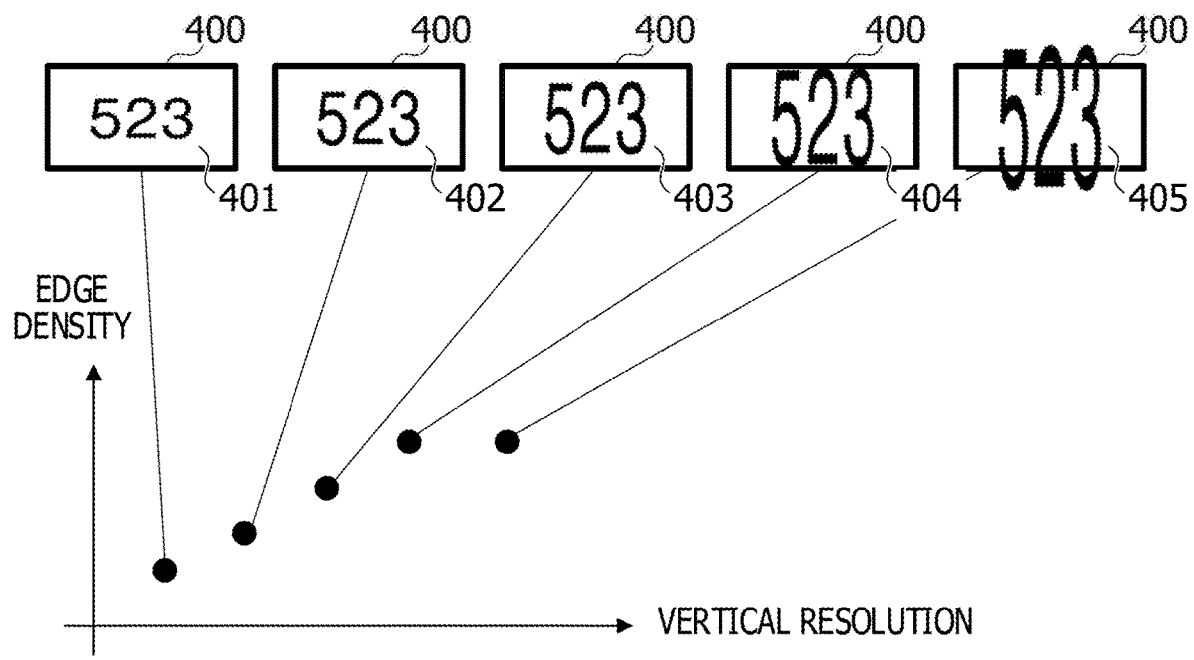
FIGS. 4A and 4B illustrate an example of a relationship between resolution and edge density.
Figure 4B:
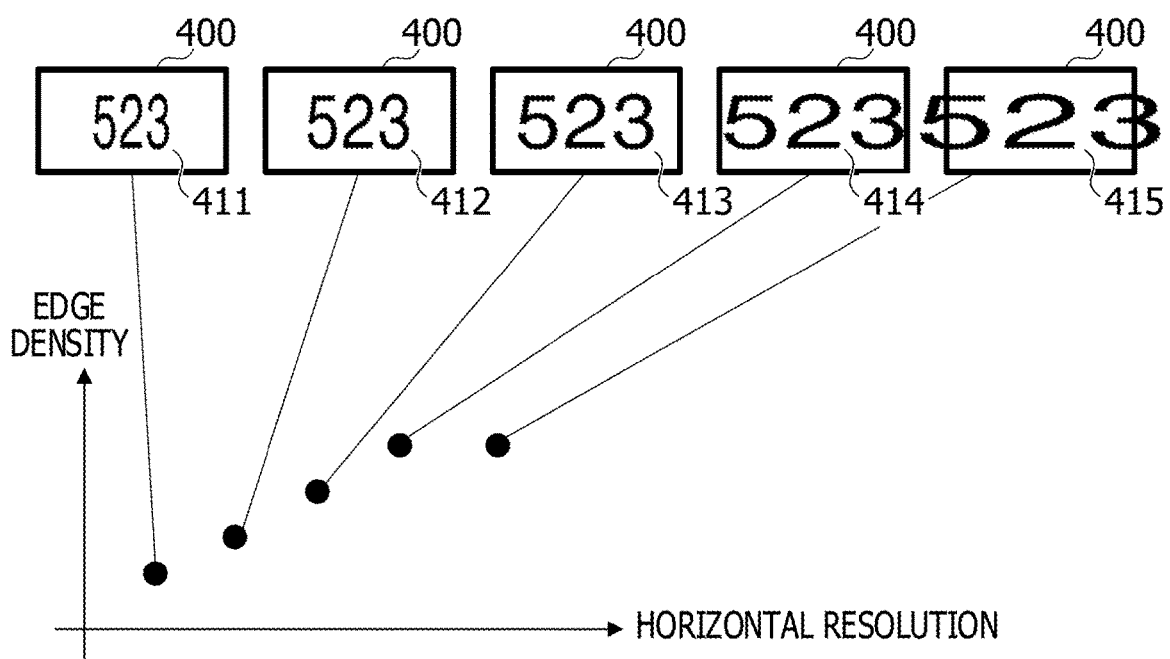

The relationship between the image data with the changed resolution and the edge density of the image area included in the scanning window at each scanning position in the image data of each resolution will be described. FIGS. 4A and 4B illustrate an example of a relationship between resolution and edge density.

FIG. 4A illustrates each image data when vertical resolution is sequentially changed in a state where horizontal resolution of image data is fixed to predetermined resolution and edge density of an image area included in a scanning window at a predetermined scanning position in the image data of each resolution.

Each image data illustrated in FIG. 4A is displayed by fixing the size of the pixel. Therefore, in each image data illustrated in FIG. 4A, the vertical size is displayed larger as the vertical resolution becomes higher.

As illustrated in FIG. 4A, in the case of image data 402 having a higher vertical resolution than that of image data 401, the edge density of the image area included in the fixed-size scanning window 400 is higher than that in the case of the image data 401. Similarly, in the case of image data 403 having higher vertical resolution than the image data 402, the edge density of the image area included in the fixed-size scanning window 400 is higher than that in the case of the image data 402. Similarly, in the case of image data 404 having higher vertical resolution than the image data 403, the edge density of the image area included in the fixed-size scanning window 400 is higher than that in the case of the image data 403. Meanwhile, in the case of image data 405 having higher vertical resolution than the image data 404, the edge density of the image area included in the fixed-size scanning window 400 is lower than in the case of the image data 404.

As described above, the edge density of the image area included in the fixed-size scanning window 400 is maximized in a state in which the characters in the image area are vertically inscribed in the fixed-size scanning window 400.

FIG. 4B illustrates each image data in a case where the horizontal resolution is sequentially changed in a state where vertical resolution of image data is fixed to predetermined resolution, and an edge density of an image area included in a scanning window at a predetermined scanning position in the image data of each resolution.

Similarly to FIG. 4A, each image data illustrated in FIG. 4B is also displayed by fixing the size of the pixel. Therefore, in each image data illustrated in FIG. 4B, the horizontal size is displayed larger as the horizontal resolution becomes higher.

As illustrated in FIG. 4B, in the case of image data 412 having higher horizontal resolution than image data 411, the edge density of the image area included in the fixed-size scanning window 400 is higher than in the case of the image data 411. Similarly, in the case of image data 413 having higher horizontal resolution than the image data 412, the edge density of the image area included in the fixed-size scanning window 400 is higher than in the case of the image data 412. Similarly, in the case of image data 414 having higher horizontal resolution than the image data 413, the edge density of the image area included in the fixed-size scanning window 400 is higher than in the case of the image data 413. Meanwhile, in the case of image data 415 having a higher horizontal resolution than that of the image data 414, the edge density of the image area included in the fixed-size scanning window 400 is lower than in the case of the image data 414.

As described above, the edge density of the image area included in the fixed-size scanning window 400 is maximized in a state in which the characters in the image area are horizontally inscribed in the fixed-size scanning window 400.

Therefore, by sequentially changing the vertical and horizontal resolution of the image data and determining the resolution at which the edge density becomes the maximum, it is possible to extract an image area in which the characters are inscribed in the scanning window in the vertical direction and the horizontal direction. That is, it is possible to extract character areas with high extraction accuracy, in which background images other than the characters are excluded as much as possible.

<Overview of Character Area Candidate Extraction Processing>

Figure 5:
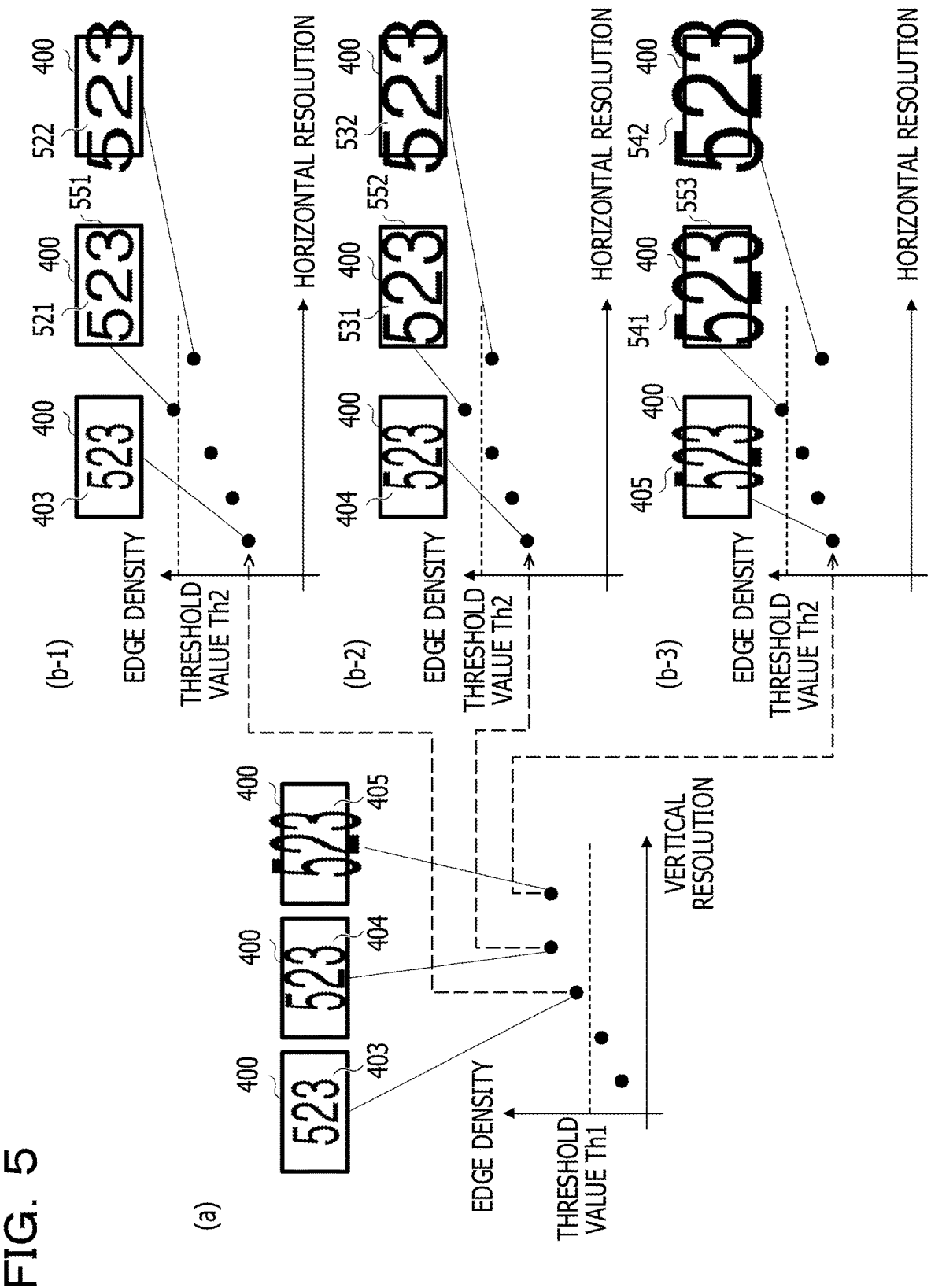
FIG. 5 illustrates an example of a character area candidate extraction processing.

The character area candidate extracting unit 304 performs the character area candidate extraction processing. FIG. 5 illustrates an example of the character area candidate extraction processing. As described above, the relative size changing unit 302 generates image data of an arbitrary combination of all resolutions within a predetermined change range in the vertical direction and all resolutions within a predetermined change range in the horizontal direction. However, in FIG. 5, for simplicity of description, only a combination of some of the resolutions is excerpted and represented. The scanning unit 303 performs scanning using the scanning window 400 with respect to all of the areas in the image data whose resolution is changed, but here, the scanning unit 303 will be described by considering a scanning position at which a predetermined character "523" is drawn in the image data.

When the position at which the predetermined character "523" in the image data is drawn becomes the scanning position, the edge density calculated by the character area candidate extracting unit 304 is changed with the change of the vertical resolution of the image data as illustrated in (a) of FIG. 5.

Among them, image data 403 to 405 in which the edge density is equal to or larger than a predetermined threshold value Th1 are considered. With respect to the vertical resolutions of the respective image data 403 to 405, when five image data having different horizontal resolutions from each other are excerpted to make the edge density into a graph, the edge density is illustrated in (b-1) to (b-3) of FIG. 5.

As illustrated in respective (b-1) to (b-3) of FIG. 5, image data (e.g., image data 521 to 542) other than the image data 403 to 405 among five image data having different horizontal resolutions have higher edge density than the image data 403 to 405.

The character area candidate extracting unit 304 specifies image data 521, 531, and 541 having a resolution in which the edge density is equal to or larger than a predetermined threshold value Th2 among the image data. The character area candidate extracting unit 304 extracts the area indicated by the scanning window 400 for the specified image data 521, 531, and 541 as character area candidates 551, 552, and 553.

<Overview of Overlapping Area Extraction Processing and Character Area Determination Processing>

Figure 6:
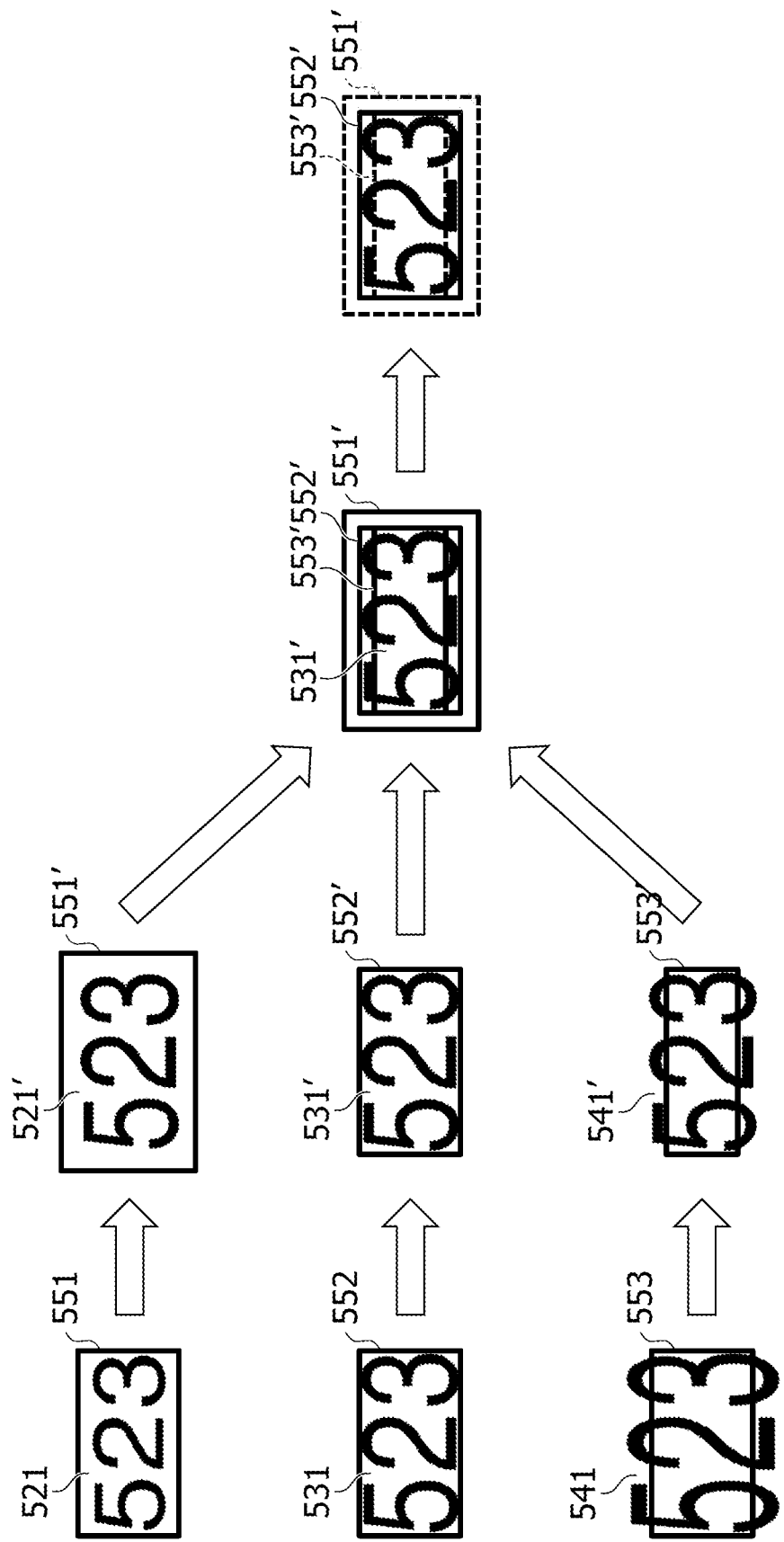
FIG. 6 illustrates an example of an overlapping area extraction processing and a character area determination processing.

The overlapping area extracting unit 305 performs the overlapping area extraction processing, and the character area determining unit 306 performs the character area determination processing. FIG. 6 illustrates an example of the overlapping area extraction processing and the character area determination processing.

As illustrated in FIG. 6, the overlapping area extracting unit 305 enlarges or reduces the sizes of the character area candidates 551, 552, and 553 extracted from the image data 521, 531, and 541.

For example, the overlapping area extracting unit 305 calculates the enlargement ratio or the reduction ratio when enlarging or reducing the image data 521, 531, and 541 to image data 521', 531', and 541' of unified resolution. For example, the overlapping area extracting unit 305 calculates the enlargement ratio when enlarging the image data 521 to the image data 521', and enlarges the character area candidate 551 using the enlargement ratio to obtain a character area candidate 551'. The overlapping area extracting unit 305 calculates the enlargement ratio when enlarging the image data 531 to the image data 531', and enlarges the character area candidate 552 using the enlargement ratio to obtain a character area candidate 552'. Further, the overlapping area extracting unit 305 calculates the reduction ratio when reducing the image data 541 to the image data 541' and reduces the character area candidate 553 using the reduction ratio to obtain a character area candidate 553'.

Subsequently, the overlapping area extracting unit 305 arranges the enlarged or reduced character area candidates 551', 552', and 553' in the unified resolution image data (here, the image data 531') to determine whether overlapping occurs.

In the case of the example of FIG. 6, since the character area candidates 551', 552', and 553' overlap with each other in a predetermined threshold area or more, the overlapping area extracting unit 305 determines that the character area candidates 551', 552', and 553' overlap with each other and extracts the character area candidates. The overlapping area extracting unit 305 associates the extracted character area candidates with each other.

The character area determining unit 306 determines a character area candidate having maximum edge density among the character area candidates 551', 552', and 553' associated by the overlapping area extracting unit 305. The example of FIG. 6 indicates that it is determined that the edge density of the image area included in the character area candidate 552' among the character area candidates 551', 552', and 553' becomes the maximum.

<Flow of Character Area Extraction Processing>

Figure 7:
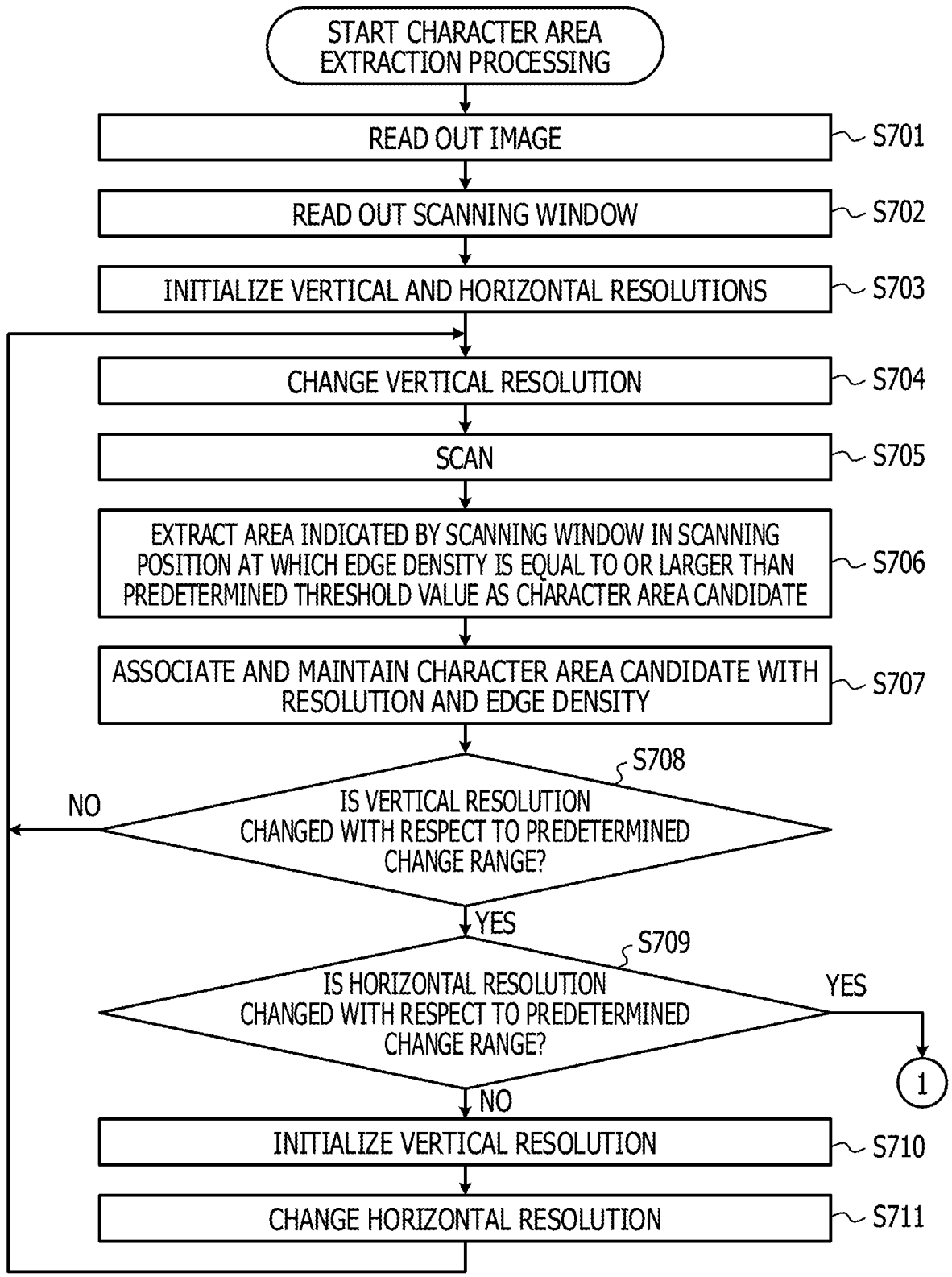
FIG. 7 illustrates an example of a character area extraction processing.
Figure 8:
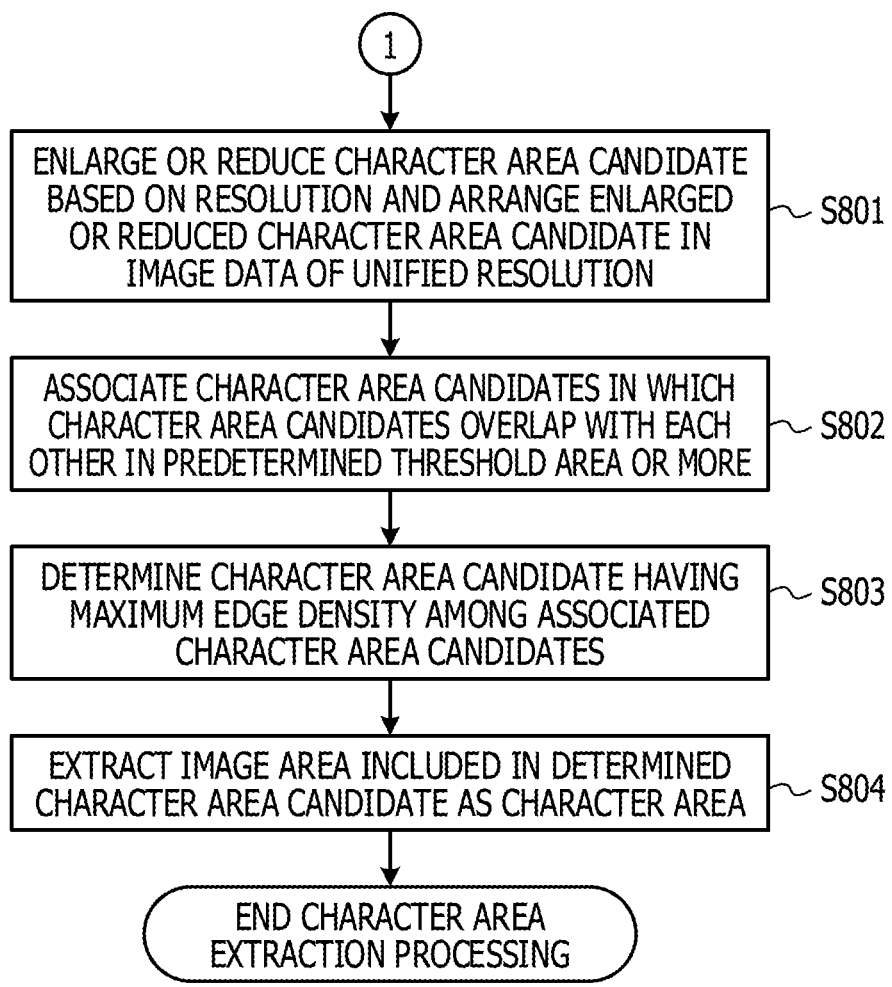
FIG. 8 illustrates an example of the character area extraction processing.
Figure 9:
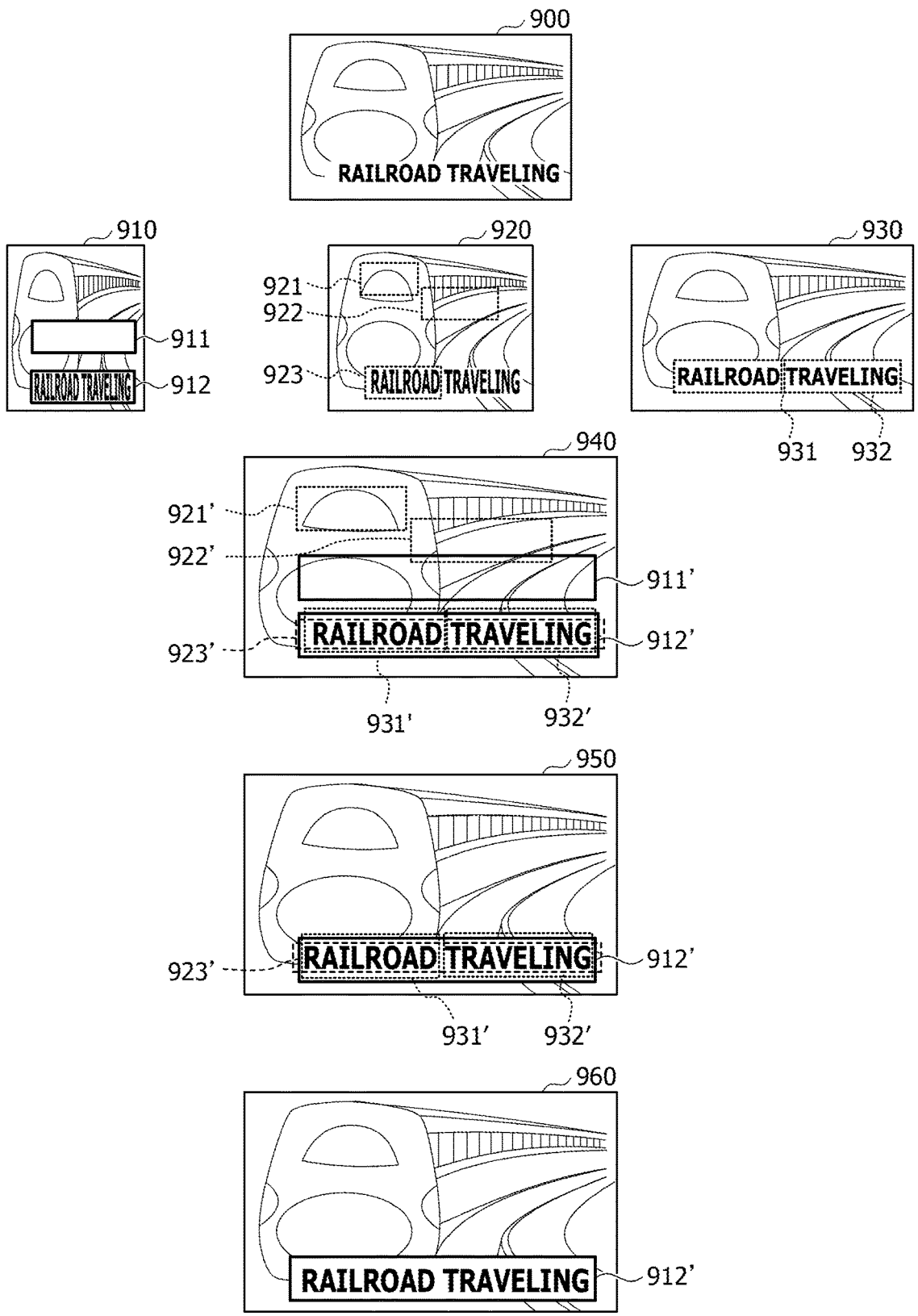
FIG. 9 illustrates an example of the character area extraction processing.

The character area extracting unit 122 performs a character area extraction processing. FIGS. 7 to 9 illustrate an example of the character area extraction processing.

In step S701, the image read-out unit 301 reads out image data 900 (FIG. 9) of the processing target frame from the image storage unit 123. In step S702, the scanning unit 303 reads out the fixed-size scanning window 400.

In step S703, the relative size changing unit 302 initializes the vertical resolution and the horizontal resolution to predetermined resolution with respect to the read-out image data 900.

In step S704, the relative size changing unit 302 changes the vertical resolution in a state where the horizontal resolution is fixed with respect to the image data whose resolution is initialized.

In step S705, the scanning unit 303 scans the image data whose vertical resolution is changed in step S703 using the fixed-size scanning window 400.

In step S706, the character area candidate extracting unit 304 performs an edge processing on the image area at each scanning position of the scanning window 400 performing scanning to detect edge pixels. The character area candidate extracting unit 304 calculates the edge density of the image area at each scanning position based on the detected edge pixels, thereby specifying the scanning position having the edge density equal to or larger than the predetermined threshold value Th2. Furthermore, the character area candidate extracting unit 304 extracts the area indicated by the scanning window at the specified scanning position as the character area candidate.

In step S707, the character area candidate extracting unit 304 associates and maintains the extracted character area candidate with the edge density and the (vertical and horizontal) resolutions.

In step S708, the relative size changing unit 302 determines whether all vertical resolutions in a predetermined change range have been covered. When it is determined in step S708 that all the vertical resolutions have not been covered (in the case of "No" in step S708), the process returns to step S704. Meanwhile, when it is determined in step S708 that all the vertical resolutions in the predetermined change range have been covered (in the case of "Yes" in step S708), the process proceeds to step S709.

In step S709, the relative size changing unit 302 determines whether to all horizontal resolutions in the predetermined change range have been covered. When it is determined in step S709 that all the horizontal resolution have not been covered (in the case of "No" in step S709), the process proceeds to step S710.

In step S710, the relative size changing unit 302 initializes the vertical resolution to the predetermined resolution. In step S711, the relative size changing unit 302 changes the horizontal resolution, and the process proceeds to step S704. As a result, in a state in which the horizontal resolution is fixed to the horizontal resolution newly changed in step S711, the scanning window 400 is scanned while sequentially changing the vertical resolution in steps S704 to S708 to extract the character area candidates.

In FIG. 9, image data 910 represents image data in a predetermined vertical resolution when scanning the scanning window 400 while changing the vertical resolution in step S704 in a state the newly changed horizontal resolution is fixed in step S711. In the case of the image data 910, the scanning window 400 is scanned to extract character area candidates 911 and 912.

Image data 920 represents image data in a predetermined vertical resolution when scanning the scanning window 400 while changing the vertical resolution in step S704 in a state in which a further changed horizontal resolution is fixed in step S711. In the case of the image data 920, the scanning window 400 is scanned to extract character area candidates 921, 922, and 923.

Image data 930 represents image data in a predetermined vertical resolution when scanning the scanning window 400 while changing the vertical resolution in step S704 in a state a further changed horizontal resolution is fixed in step S711. In the case of the image data 930, the scanning window 400 is scanned to extract character area candidates 931 and 932.

FIG. 7 will be referred back. When it is determined in step S709 that all the horizontal resolutions in the predetermined change range have been covered (in the case of "Yes" in step S709), the process proceeds to step S801 of FIG. 8.

In step S801, the overlapping area extracting unit 305 reads out the character area candidates 911, 912, 922, 923, 931, and 932 held in step S707. The overlapping area extracting unit 305 calculates an enlargement ratio or a reduction ratio for rendering the resolution (vertical direction, horizontal direction) associated with the read-out character area candidate to a unified resolution. Further, based on the calculated enlargement ratio or reduction ratio, the overlapping area extracting unit 305 enlarges or reduces the character area candidates 911 to 932 and arranges the character area candidates 911 to 932 in the image data of the unified resolution.

In FIG. 9, image data 940 represents the image data of the unified resolution. Character area candidates 911' to 932' represent states in which the character area candidates 911 to 932 held in step S707 are enlarged or reduced and arranged in the image data 940, respectively.

For example, the character area candidate 911' represents a state of the character area candidate 911 extracted from the image data 910, which is enlarged based on the enlargement ratio of the image data 910 for the image data 940 and arranged in the image data 940. The character area candidate 912' represents a state of the character area candidate 912 extracted from the image data 910, which is enlarged based on the enlargement ratio of the image data 910 for the image data 940 and arranged in the image data 940.

Similarly, the character area candidate 921' represents a state of the character area candidate 921 extracted from the image data 920 which is enlarged based on the enlargement ratio of the image data 920 for the image data 940 and arranged in the image data 940. The character area candidate 922' represents a state of the character area candidate 922 extracted from the image data 920, which is enlarged based on the enlargement ratio of the image data 920 for the image data 940 and arranged in the image data 940. The character area candidate 923' represents a state of the character area candidate 923 extracted from the image data 920, which is enlarged based on the enlargement ratio of the image data 920 for the image data 940 and arranged in the image data 940.

Similarly, the character area candidate 931' represents a state of the character area candidate 931 extracted from the image data 930 which is enlarged based on the enlargement ratio of the image data 930 for the image data 940 and arranged in the image data 940. The character area candidate 932' represents a state of the character area candidate 932 extracted from the image data 930, which is enlarged based on the enlargement ratio of the image data 930 for the image data 940 and arranged in the image data 940.

FIG. 8 will be referred back. In step S802, the overlapping area extracting unit 305 determines whether the character area candidates arranged in the image data of the unified resolution overlap with each other in a predetermined threshold area or more. When it is determined that the character area candidates overlap with each other in the predetermined threshold area or more, the overlapping area extracting unit 305 extracts overlapping character area candidates and associates the extracted character area candidates with each other.

Image data 950 of FIG. 9 indicates that it is determined that the character area candidates 912', 923', 931', and 932' among the character area candidates 911' to 932' arranged in the image data 940 of the unified resolution overlap with each other and associated with each other.

In step S803, the character area determining unit 306 determines a character area candidate having the maximum edge density among character area candidates associated with each other. Image data 960 of FIG. 9 indicates that it is determined that the edge density of the character area candidate 912' is the maximum among the edge densities of the character area candidates 912', 923', 931', and 932' associated with each other.

In step S804, the character area determining unit 306 extracts the image area included in the character area candidate 912' determined to have the maximum edge density as the character area.

As is apparent from the above description, the character area extracting device according to the first embodiment scans the image data of the frame to be processed while changing the resolution by using the fixed scanning window to specify each scanning position at which the edge density is equal to or larger than a predetermined threshold value. The character area extracting device according to the first embodiment extracts the area indicated by the scanning window as the character area candidate at each specific scanning position. The character area extracting device according to the first embodiment arranges the extracted character area candidates in the image data of the unified resolution and determines the character area candidate having the maximum edge density among the character area candidates which overlap with each other. Furthermore, the character area extracting device according to the first embodiment extracts the image area included in the determined character area candidate as the character area.

As described above, by extracting the character area based on the edge density, it is possible to extract the image area in which the characters are inscribed in the scanning window as the character area. That is, it is possible to extract character areas with high extraction accuracy, in which background images other than the characters are excluded as much as possible.

Second Embodiment

In the first embodiment, the relative size changing unit 302 has been described as sequentially changing the vertical resolution with the horizontal resolution fixed first, however, a changing order is not limited thereto. For example, the horizontal resolution may be sequentially changed while the vertical resolution is first fixed.

In the first embodiment, the character recognition processing is described as being executed in the terminal 130, but the character recognition processing may be executed by the image processing apparatus 120. In the first embodiment, it is described that the character area extraction processing is performed by the character area extracting unit 122 of the image processing apparatus 120, but a part of the function of the character area extracting unit 122 may be installed in another device and executed by a plurality of apparatuses (e.g., by the system). The plurality of corresponding apparatuses may include the imaging apparatus 111 or the terminal 130.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium recording a character area extraction program for causing a computer to execute a process comprising:
changing a resolution of an image in a scanning window that scans the image;
scanning, in the scanning window, the image in which the resolution is changed;
specifying a scanning position at which an edge density of an image area included in the scanning window is equal to or larger than a threshold value;
extracting one or more areas indicated by the scanning window at the specified scanning position as one or more character area candidates;
determining, when overlapped character area candidates included in the one or more character area candidates overlap with each other, a maximum character area candidate having a maximum edge density among the overlapped character area candidates; and
extracting the image area included in the maximum character area candidate as a character area.

2. The non-transitory computer-readable recording medium according to claim 1, wherein a size of the scanning window is fixed, a horizontal resolution of the image is fixed, and a vertical resolution of the image is sequentially changed.

3. The non-transitory computer-readable recording medium according to claim 1, wherein the size of the scanning window is fixed, the vertical resolution of the image is fixed, and the horizontal resolution of the image is sequentially changed.

4. The non-transitory computer-readable recording medium according to claim 1, further comprising:
enlarging or reducing the size of the one or more character area candidates by using a predetermined enlargement ratio or a predetermined reduction ratio; and
extracting the overlapped character area candidates which overlap with each other from among enlarged or reduced character area candidates.

5. An information processing apparatus comprising:
a memory; and
a processor coupled to the memory and configured to preform operations of:
changing a resolution of an image in a scanning window that scans the image;
scanning, in the scanning window, the image in which the resolution is changed;
specifying a scanning position at which an edge density of an image area included in the scanning window is equal to or larger than a threshold value;
extracting one or more areas indicated by the scanning window at the specified scanning position as one or more character area candidates;
determining, when overlapped character area candidates included in the one or more character area candidates overlap with each other, a maximum character area candidate having a maximum edge density among the overlapped character area candidates; and
extracting the image area included in the maximum character area candidate as a character area.

6. The information processing apparatus according to claim 5, wherein a size of the scanning window is fixed, a horizontal resolution of the image is fixed, and a vertical resolution of the image is sequentially changed.

7. The information processing apparatus according to claim 5 wherein the size of the scanning window is fixed, the vertical resolution of the image is fixed, and the horizontal resolution of the image is sequentially changed.

8. The information processing apparatus according to claim 5, wherein the operations include:
enlarging or reducing the size of the one or more character area candidates by using a predetermined enlargement ratio or a predetermined reduction ratio; and
extracting the overlapped character area candidates which overlap with each other from among enlarged or reduced character area candidates.

9. A character area extraction method comprising:
changing, by a computer, a resolution of an image in a scanning window that scans the image;
scanning, in the scanning window, the image in which the resolution is changed;
specifying a scanning position at which an edge density of an image area included in the scanning window is equal to or larger than a threshold value;

extracting one or more areas indicated by the scanning window at the specified scanning position as one or more character area candidates;

determining, when overlapped character area candidates included in the one or more character area candidates overlap with each other, a maximum character area candidate having a maximum edge density among the overlapped character area candidates; and extracting the image area included in the maximum character area candidate as a character area.

10. The character area extraction method according to claim 9, wherein a size of the scanning window is fixed, a horizontal resolution of the image is fixed, and a vertical resolution of the image is sequentially changed.

11. The character area extraction method according to claim 9, wherein the size of the scanning window is fixed, the vertical resolution of the image is fixed, and the horizontal resolution of the image is sequentially changed.

12. The character area extraction method according to claim 9 further comprising:

enlarging or reducing the size of the one or more character area candidates by using a predetermined enlargement ratio or a predetermined reduction ratio; and extracting the overlapped character area candidates which overlap with each other from among enlarged or reduced character area candidates.

* * * * *